US011972881B1

(12) United States Patent
Hanna

(10) Patent No.: US 11,972,881 B1
(45) Date of Patent: Apr. 30, 2024

(54) MAGNETIZED CABLE FOR IMPROVED CABLE MANAGEMENT

(71) Applicant: John Nashed Hanna, Austin, TX (US)

(72) Inventor: John Nashed Hanna, Austin, TX (US)

( * ) Notice: Subject to any disclaimer, the term of this patent is extended or adjusted under 35 U.S.C. 154(b) by 0 days.

(21) Appl. No.: 18/339,272

(22) Filed: Jun. 22, 2023

Related U.S. Application Data

(60) Provisional application No. 63/482,006, filed on Jan. 27, 2023.

(51) Int. Cl.
*H01B 7/40* (2006.01)
*H01B 7/08* (2006.01)
*H01B 13/00* (2006.01)

(52) U.S. Cl.
CPC ........... *H01B 7/40* (2013.01); *H01B 13/0036* (2013.01); *H01B 7/08* (2013.01)

(58) Field of Classification Search
CPC ........ H01B 7/40; H01B 13/0036; H01B 7/08; H01B 7/06; B65H 75/34
USPC ........................................................ 174/70 R
See application file for complete search history.

(56) References Cited

U.S. PATENT DOCUMENTS 1,708,165 A * 4/1929 Willat .................. H02G 11/003 5/255
3,229,030 A * 1/1966 Baermann ............. E05C 19/161 29/608
5,710,812 A * 1/1998 Fogel ...................... H04M 1/15 379/438
6,370,304 B1 * 4/2002 Mills .................... G02B 6/4482 385/114
2009/0314515 A1 * 12/2009 Bevirt ...................... H01B 7/40 174/110 R
2011/0308835 A1 * 12/2011 Piekny ................... H02G 11/02 174/69
2014/0034382 A1 * 2/2014 Mateski ............... B65H 75/362 174/74 R
2014/0332264 A1 * 11/2014 Chen ........................ H01B 7/40 174/70 R
2015/0101187 A1 * 4/2015 Erickson ................. B23P 11/00 29/729
2015/0187468 A1 * 7/2015 Kulas ................. H01B 13/0016 29/825
2015/0349438 A1 * 12/2015 Allen ................. H01R 13/6205 439/40
2019/0013114 A1 * 1/2019 Rodriguez ............... H01B 7/40
2019/0083192 A1 * 3/2019 Spindler ............. A61M 27/008

* cited by examiner

*Primary Examiner* — Timothy J Thompson
*Assistant Examiner* — Michael F McAllister
(74) *Attorney, Agent, or Firm* — Jackson Walker LLP

(57) ABSTRACT

A magnetized cable in which the magnetic force of the cable is configured to aid in aligning and maintaining alignment of the cable while the cable is being looped for storage and, when the cable is rolled or looped, the magnetic force will aid in keeping the cable coiled. Embodiments of the magnetized cable include an elongated flexible magnetic component (EFMC) of a pliable polymer such as rubber and/or one or more other suitable materials in combination with magnetic particles comprising iron, neodymium, ferrite, cobalt, nickel, and/or other suitable magnetic elements or compounds. The EFMC may be exposed to a strong magnetic field to produce a permanent magnet. The EFMC may be enclosed within a sheathing material of braided textile yarns or another suitable material.

18 Claims, 2 Drawing Sheets

MAGNETIZED CABLE FOR IMPROVED CABLE MANAGEMENT

RELATED APPLICATIONS

This application claims priority, under 35 USC 119(e), to U.S. App. No. 63/482,006, filed Jan. 27, 2023, the entirety of which is incorporated by reference herein.

TECHNICAL FIELD

This application generally pertains to cables used with electronic products and, more specifically, management of such cables.

BACKGROUND

Electronics products such as laptop computers, smartphones, etc. often use cables for input and output of power, data, audio, etc. When not in use, such cables frequently become entangled, causing frustration for the user.

SUMMARY

Subject matter included herein discloses a magnetized cable in which a persistent magnetic field produced by the cable is configured to aid in aligning and maintaining alignment of the cable while the cable is being looped, wound, or otherwise coiled for storage or transport and, when the cable is in a coiled state, maintaining the cable in coiled state while also permitting a user to easily uncoil the cable by hand.

In one aspect, disclosed magnetized cables include an elongated flexible magnetized component (EFMC) and one or more bare or insulated electrically conductive wires. The EFMC is fabricated to produce a persistent magnetic force wherein at least some portion of the magnetized cable is magnetically attracted to at least some other portion of the magnetized cable when the two portions are in proximity to one another such as when the magnetized cable is coiled or being coiled. The EFMC may include a pliable polymer base or binder comprised of rubber, silicon, silicon-rubber, chlorinated polyethylene, or another suitable material, in combination with a plurality of magnetic particles randomly or otherwise distributed within and/or upon the pliable polymer base. The magnetic particles may include particles of any suitable magnetic element, compound, or alloy including, as non-limiting examples, ferrite, iron, cobalt, nickel, neodymium, ferric oxide, alnico, samarium and so forth. The magnetic particles may be produced by grinding or otherwise processing magnetic materials.

The EFMC may be fabricated by extruding, molding, or otherwise processing the pliable polymer binder to produce an elongated flexible component, which may be cut to any desired length. The magnetic particles may be combined with the pliable polymer binder during and/or after formation of the elongated flexible component. The magnetic particles may then be magnetically aligned by exposing the elongated flexible component to a strong magnetic field produced by one or more magnets. Varying arrangements of north and south poles may be used to strengthen the resulting magnetic pull of the EFMC.

In at least one embodiment, the magnetic cable has a substantially rectangular cross section defining first and second substantially planar and parallel major surfaces and the persistent magnetic force is configured wherein the first major surface lies within a first polarity region of the persistent magnetic field and the second major surface lies within a second polarity region of the persistent magnetic field, thus providing a magnetic attraction between the major surfaces when they are in proximity to each other such as during coiling of the cable or when the cable is already in a coiled state. In some embodiment, the cross section may have an aspect ratio, e.g., width to height ratio in the range of approximately 2 to 10.

In some embodiments, one or more of the wires may be embedded within and surrounded by the EFMC. In some embodiments, the EFMC may define one or more elongated grooves to accommodate one or more of the wires. The magnetized cable may further include a cable jacket or sheath enclosing and securing the one or more electrically conductive wires and the EFMC. In sheathed embodiments, the sheath may be comprised of a polymer such as plastic, nylon, rubber, or another suitable material, enclosing and securing the EFMC and the wires. The sheath may be implemented with a braided or woven textile. The textile may be natural or synthetic.

In another aspect, a disclosed method for fabricating a magnetized cable includes forming an elongated flexible component, incorporating magnetic particles into and/or upon the elongated flexible component, and magnetizing the flexible component by exposing the flexible component to a strong magnetic field produced by one or more magnets to produce the EFMC as a flexible permanent magnet wherein at least some portion of the EFMC, e.g., a first major surface of the EFMC, is magnetically attracted to at least some other portion of the EFMC, e.g., a second major surface of the EFMC. The portions of the EFMC that are magnetically attracted may be configured to assist or otherwise facilitate the process of coiling or winding the magnetized cable for storage. One or more electrically conductive wires may be incorporated within or adjacent to the EFMC and an optional sheath may be formed to enclose and secure the EFMC and the one or more wires. The EFMC and the one or more wires may then be cut to a desired length. Electrical connectors may be affixed at either end of the magnetized cable. The elongated flexible component may comprise a polymer selected from rubber, silicon, silicon-rubber, or chlorinated polyethylene or other material.

A cross section of the magnetized cable may be substantially rectangular and the persistent magnetic force may include a first polarity region corresponding to a first major surface defined by the substantially rectangular cross section and a second polarity region corresponding to a second major surface defined by the substantially rectangular cross section.

Incorporating the one or more electrically conductive wires may include forming the EFMC around the one or more electrically conductive wires such that the wires are embedded in the EFMC. Alternatively, the wires may incorporated adjacent to, but not embedded within the EFMC. These embodiments may further include enclosing the EFMC and the one or more electrically conductive wires in a sheath of braided nylon or another suitable material wherein the wires are positioned in voids defined by the sheath and the EFMC.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
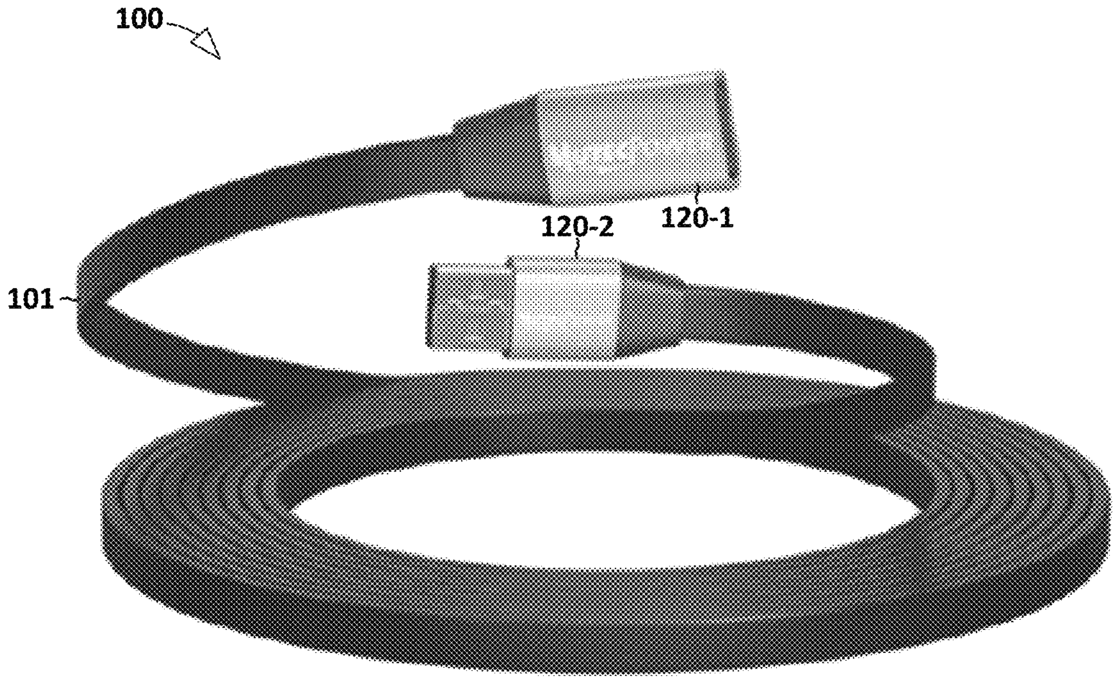
FIG. 1 illustrates a perspective view of a magnetized cable.

Exemplary embodiments and their advantages are best understood by reference to FIGS. 1-4, wherein like numbers are used to indicate like and corresponding parts unless expressly indicated otherwise.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

Referring now to the drawings, FIG. 1 illustrates a perspective view of a magnetized cable assembly 100 including an elongated and flexible magnetized cable 101 including one or more bare or insulated electrically conductive wires (not visible in FIG. 1) connected to electrical connectors 120 at either end of magnetized cable 101. Magnetized cable 101 incorporates magnetic particles that have been magnetized to produce a persistent magnetic field in which some surface regions of magnetized cable 101 lie within a north pole region of the magnetic field and other surface regions of magnetized cable 101 lie within a south pole region of the magnetic field. In at least some embodiments, an orientation and strength of the persistent magnetic field, in combination with the geometry and dimensions of magnetized cable 101, enable efficient storage and handling of magnetized cable 101 by facilitating a coiling of magnetized cable 101 from an extended or uncoiled state and, when magnetized cable 101 is coiled, maintaining magnetized cable 101 in the coiled state while also permitting easy manually uncoiling of magnetized cable 101 from the coiled state.

Embodiments of magnetized cable 101 may have a rectangular or substantially rectangular cross section including an opposing pair of substantially planar and parallel major surfaces and a pair of substantially planar and parallel minor surfaces. In these rectangular embodiments, the persistent magnetic field may be oriented to produce a north pole region encompassing one of the major surfaces and a south pole region encompassing the other major surface. Those of ordinary skill in the field will appreciate that, in such embodiments, magnetized cable 101 features a north pole surface and a south pole surface that come in contact with each other when the cable is coiled or otherwise wound on itself, e.g., prior to storing magnetized cable 101 when not in use. Those of ordinary skill will further appreciate that magnetized cable 101 is not limited to rectangular configurations and that the storage and handling benefits of magnetized cable 101 may be realized in other configurations including, without limitation, circular and other elliptical cross section configurations.

Figure 2:
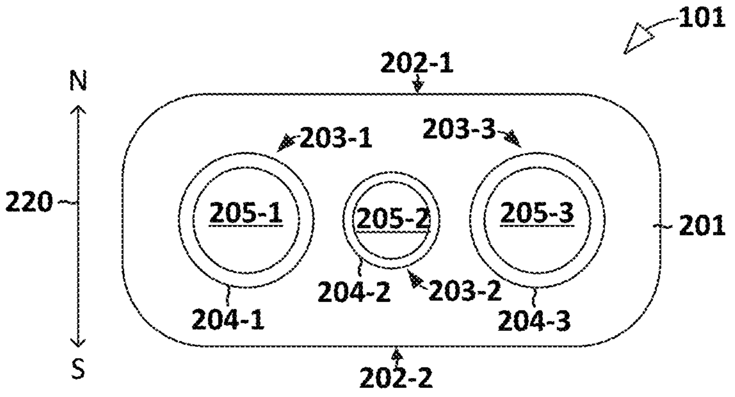
FIG. 2 illustrates a section view of an unsheathed magnetized cable.
Figure 3:
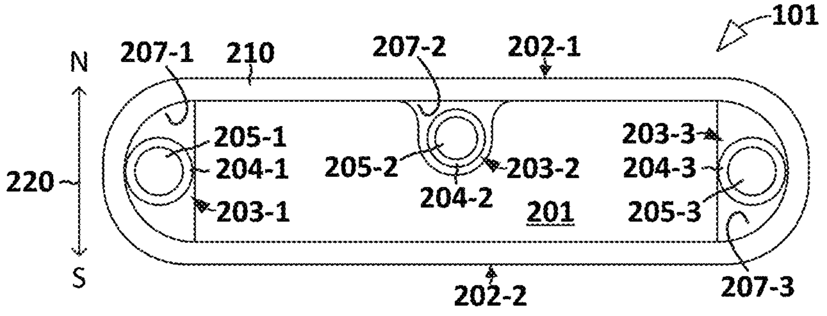
FIG. 3 illustrates a sheathed embodiment of a magnetized cable.

FIG. 2 and FIG. 3 illustrate cross sections for an unsheathed (FIG. 2) AND sheathed (FIG. 3) implementations of magnetized cable 101. The unsheathed implementation of magnetized cable 101 depicted in FIG. 2 includes an elongated and flexible magnetic member, referred to herein simply as elongated flexible magnetized component (EFMC) 201, encompassing one or more electrically conductive wires 203. Although FIG. 2 depicts a magnetized cable 101 featuring three wires (203-1, 203-2, and 203-2), other implementations may employ fewer or more wires 203.

EFMC 201 may comprise any suitable combination of flexible base material and magnetized particles distributed randomly or otherwise upon or within the base material. The base material may be implemented with any of various natural or synthetic polymers exhibiting suitable flexibility. In at least some embodiments, the base material is or includes a pliable natural or synthetic rubber, silicon, silicon-rubber, or chlorinated polyethylene material exhibiting sufficient flexibility and other desirable characteristics including, without limitation, low electrical and thermal conductivity, high thermal and chemical stability, and low toxicity. The base material may be produced by any suitable manufacturing process including extrusion processes, compression molding processes, etc. The magnetized particles may comprise magnetic particles that have been subjected to a magnetic field sufficiently strong to align the magnetic orientation of the magnetic particles. The source material may be ground or otherwise processed to produce a magnetic powder that can be easily incorporated within the base material.

The unsheathed magnetized cable 101 depicted in FIG. 2 features a rectangular or substantially rectangular cross section, with optional rounded or beveled corners, defining substantially planar and parallel opposing major surfaces 202-1 and 202-2. The illustrated magnetized cable 101 includes three wires 203-1, 203-2, and, 203-3 embedded in EFMC 201. Each wire 203 depicted in FIG. 2 includes an electrically conductive core 205 enclosed within an optional insulating coating 204. In at least one embodiment, electrically conductive cores 205 are implemented with tinned copper and insulating coating 204 is implemented with highly flexible PVC. Other implementations may use different materials for conductive cores 205 and insulating coating 204.

The wires 203 Illustrated in FIG. 2 include two wires 205-1 and 205-3 with a larger diameter or smaller gage and a third wire 205-2 with a smaller diameter or larger gage. Again, however, the number of wires 203 included in magnetized cable 101 and the diameters of each wire 203 is a design choice that may vary from one implementation to the next. Wires 203 may be incorporated within EFMC 201 while EFMC 201 is being formed. For example, magnetized cable may be fabricated by an extrusion process in which one or more wires 203 are fed through an extrusion tool as EFMC 201 is extruded around them. Other embodiments may incorporate wires 203 within EFMC 201 after EFMC 201 is formed.

FIG. 2 further illustrates a magnetic field indicator 220 to convey an orientation of a persistent magnetic field produced by magnetized cable 101. The magnetic field indicator 220 of FIG. 2 indicates that a "north" surface of magnetized cable 101, i.e., first major surface 202-1, lies within a northern pole region of the magnetic field while a "south" surface of magnetized cable 101, i.e., second major surface 202-2, lies within a southern pole region of the persistent magnetic field. In the depicted configuration, it will readily appreciated that, when magnetized cable 101 as coiled upon itself, whether for storage or otherwise, portions of first major surface 202-1 within one loop of the coiled cable will come into close proximity with portions of second major surface 202-2 in the next adjacent loop of the coiled cable and that the persistent magnetic field will provide a magnetic force of attraction between the opposing major surfaces that actively assists in the coiling process as the cable magnetically "snaps" onto itself. In at least some embodiments, a strength of the persistent magnetic field will be sufficient to maintain the opposing major surfaces of magnetized cable 101 in contact with one another after the person or device coiling the cable releases the cable.

Some embodiments implement a Halbach array configuration in which the polarity of the magnetic field alternates, e.g., N—S—N—S, to increase the magnetic flux on one side of a magnetic assembly.

The sheathed magnetized cable 101 depicted in FIG. 3, like the unsheathed magnetized cable 101 depicted in FIG. 2, includes an EFMC 201 and a set of three wires 203-1, 203-2, and 203-3. Unlike the magnetized cable 101 of FIG. 2, however, the magnetized cable 101 of FIG. 3 includes a sheath 210 surrounding and enclosing EFMC 201 and wires 203. In addition, whereas the wires 203 depicted in FIG. 2 are embedded within EFMC 201, the wires 203 depicted in FIG. 3 are not embedded within EFMC 201. Instead, the wires 203 of FIG. 3 are positioned within voids 207 defined between EFMC 201 and the surrounding sheath 210. The EFMC 201 of FIG. 3 occupies a substantial majority of the cavity defined by the interior of sheath 210 and the voids 207 are not so large as to leave appreciable distance between sidewalls of wires 203 and sheath 210 or EFMC 201. Instead the voids are sized to closely retain wires 203 within close proximity to adjacent portions of sheath 210 and EFMC 201. In at least one embodiment, sheath 210 is comprised of a braided fabric nylon, but other suitable materials may be used. In at least one additional embodiment, sheath 210 is comprised of an extruded polymer.

Like the magnetized cable 101 of FIG. 2, the sheathed magnetized cable 101 depicted in FIG. 3 includes a persistent magnetic field represented by magnetic field indicator 220. The magnetized cable 201 illustrated in FIG. 3 has an oval cross section that defines substantially planar and parallel first and second major surfaces 202-1 and 202-2 and the persistent magnetic field conveyed by indicator 220 places first major surface 202-1 in a northern pole region of the persistent magnetic and second major filed 202-2 in a southern pole region of the persistent magnetic field. This configuration again, as it did with the configuration illustrated in FIG. 2, facilitates efficient handling and storage of magnetized cable 101 by providing a magnetic field that actively assists in the coiling process and, after the cable is coiled, maintaining magnetized cable 101 in the coiled position. Because wires 203 are not embedded in EFMC 201, EFMC 201 can be fabricated independently of wires 203.

Figure 4:
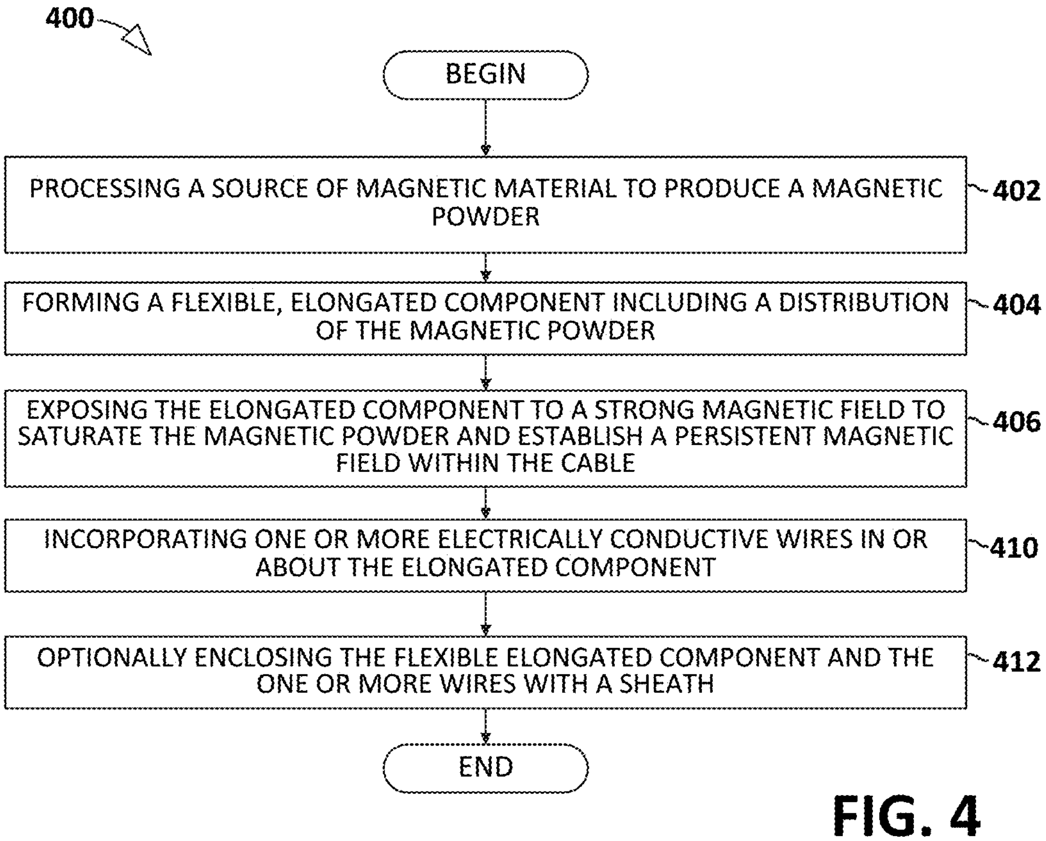
FIG. 4 illustrates a flow diagram of a method for fabricating magnetized cable.

Referring now to FIG. 4, a flow diagram illustrates an exemplary method 400 of producing magnetized cable 101. While the flow diagram implies an order or sequence of the depicted operations, the diagram is not intended to be so limiting and, unless an order of two or more operations is expressly disclosed, operations of method 400 may occur in a different sequence where appropriate.

The illustrated method 400 includes grinding and/or otherwise processing (operation 402) a source of magnetic material to produce a magnetic powder containing magnetic particles. The source of the magnetic material may include scrap, recycled, waste, or otherwise previously used magnetic material.

The method 400 illustrated in FIG. 4 furthers include forming (operation 404) an flexible elongated component by combining the magnetic particles and an EFMC base material. The EFMC base material may include a rubber, silicon, silicon-rubber, or another suitable material. The EFMC base material may be extruded, molded, or otherwise formed into the elongated flexible component and the magnetic particles may be combined with the base material either during or after the formation process to produce a random or non-random distribution of magnetic particles within the flexible elongated component.

After the formation process, the flexible elongated component may be exposed (operation 406) to a magnetic field of sufficient strength and for a sufficient duration to align or substantially align the magnetic orientation of all or substantially all of the magnetic particles to establish a persistent magnetic field within the flexible elongate and thereby transform the combination of the flexible elongated component and the magnetic particles into an elongated flexible permanent magnet referred to herein as the EFMC.

As depicted in FIG. 4, method 400 may further include incorporating (operation 410) one or more bare or insulated electrically conductive wires in or about the EFMC. In some embodiments, the EFMC may be formed to include one or more elongated grooves suitable for receiving or engaging the one or more wires. In these embodiments, the one or more wires may be incorporated after the EFMC has been formed. In other embodiments, the one or more wires may be present when the EFMC is formed such that the EFMC is formed around and enclosing the one or more wires.

The method 400 illustrated in FIG. 4 further includes an optional operation for enclosing (operation 412) the EFMC and the one or more wires within a suitable sheath.

In other embodiments, magnetized cable may be produced by providing a flexible magnet, comprising a polymer with magnetic material, in tube form. The flexible magnetic tube may be positioned around and/or adjacent to the one or more insulated or bare metal, electrically conductive wires before securing the one or more wires and the magnetic tube via heat shrinking, adhesive bonding, or another suitable method.

In some embodiments, a flexible magnet may be supplied in tape form. The tape may be fastened to the length of the cable by means of heat shrinking, adhesive bonding, or other method.

In some embodiments, one or more magnetic wires may be added in parallel to the existing conductors in a cable. In another embodiment, magnetic wires may be used to replace existing conductors in a cable.

In some embodiments, a magnetic sheath may be be added around an existing non-magnetized cable.

In another embodiment, discrete (individual) magnetic beads or shapes may be arrayed along the length of the cable.

In some embodiments, magnetic flux concentrators may be used. Magnetic flux concentrators are pieces of ferrous material that can be used to direct or intensify magnetic flux in a particular direction. In embodiments featuring a rectangular cross section cable, (e.g., the magnetized cable 101 of FIG. 1), the flat faces of the cable allow more surface area (and therefore greater magnetic force) between cable loops.

In some embodiments, additional magnetization may be added to the connectors at either end of the magnetized cable. Connectors are typically larger in cross section than the cables between them, allowing greater volume for more magnetic material and stronger magnetization. Strong magnetic attraction at the end of the cables can provide tactile and/or audible feedback to the user that the cable has been securely coiled.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A magnetized cable comprising:

one or more electrically conductive wires; and an elongated flexible magnetized component (EFMC) configured to produce a persistent magnetic force wherein at least some portions of the magnetized cable are magnetically attracted to at least some other portions of the magnetized cable when the magnetized cable is coiled, wherein:

the EFMC includes a pliable polymer binder and magnetic particles distributed within the pliable polymer binder;

the magnetic cable has a substantially rectangular cross section defining a pair of substantially planar and parallel major surfaces; and a first of the major surfaces lies within a first polarity region of the persistent magnetic field and a second of the major surfaces lies within a second polarity region of the persistent magnetic field.

2. A magnetized cable comprising:

one or more electrically conductive wires; and an elongated flexible magnetized component (EFMC) configured to produce a persistent magnetic force wherein at least some portions of the magnetized cable are magnetically attracted to at least some other portions of the magnetized cable when the magnetized cable is coiled, wherein the EFMC includes a pliable polymer binder and magnetic particles distributed within the pliable polymer binder, and wherein magnetic orientations of the magnetic particles are substantially aligned to produce the persistent magnetic force.

3. The magnetized cable of claim 1, further comprising a sheath enclosing the EFMC and the one or more electrically conductive wires.

4. The magnetized cable of claim 3, wherein the sheath comprises a natural or synthetic textile sheath.

5. The magnetized cable of claim 3, wherein the sheath comprises an extruded polymeric sheath.

6. A magnetized cable comprising:

one or more electrically conductive wires; and an elongated flexible magnetized component (EFMC) configured to produce a persistent magnetic force wherein at least some portions of the magnetized cable are magnetically attracted to at least some other portions of the magnetized cable when the magnetized cable is coiled, wherein at least one of the one or more electrically conductive wires is embedded in and surrounded by the EFMC.

7. A magnetized cable comprising:

one or more electrically conductive wires; and an elongated flexible magnetized component (EFMC) configured to produce a persistent magnetic force wherein at least some portions of the magnetized cable are magnetically attracted to at least some other portions of the magnetized cable when the magnetized cable is coiled, wherein at least one or more electrically conductive wires are positioned within elongated grooves of the EFMC.

8. The magnetized cable of claim 1, wherein at least one of the one or more electrically conductive wires comprise an insulated wire including an insulating material surrounding an electrically conductive core.

9. A method for fabricating a magnetized cable, the method comprising:

forming an elongated flexible magnetic component (EFMC);

exposing the EFMC to a magnetic field of sufficient strength to create a persistent magnetic field wherein the persistent magnetic field is oriented wherein at least some portion of the EFMC is magnetically attracted to at least some other portion of the EFMC when the magnetized cable is coiled; and incorporating one or more electrically conductive wires within or adjacent to the EFMC.

10. The method of claim 9, wherein forming the EFMC comprises forming a pliable polymer base and introducing magnetic particles into the pliable polymer base.

11. The method of claim 10, wherein a cross section of the magnetized cable is substantially rectangular and wherein the persistent magnetic force includes:

a first polarity region corresponding to a first major surface defined by the substantially rectangular cross section; and a second polarity region corresponding to a second major surface defined by the substantially rectangular cross section.

12. The method of claim 9, wherein the EFMC comprises a polymer selected from rubber, silicon, silicon-rubber, and chlorinated polyethylene.

13. The method of claim 9, wherein forming the EFMC comprises extruding the EFMC.

14. The method of claim 9, wherein forming the EFMC comprises forming the EFMC with a compression molding process.

15. The method of claim 9, wherein forming the EFMC comprises forming the EFMC with an injection molding process.

16. The method of claim 9, wherein incorporating the one or more electrically conductive wires comprises forming the EFMC around at least one of the one or more electrically conductive wires.

17. The method of claim 9, further comprises enclosing the EFMC and the one or more electrically conductive wires within a sheath.

18. The method of claim 17, wherein incorporating the one or more wires comprises incorporating the one or more wires in voids defined between the sheath and the EFMC.

* * * * *